(12) United States Patent
Eberts

(10) Patent No.: US 9,218,921 B2
(45) Date of Patent: Dec. 22, 2015

(54) SHUNT SEPARATING CAM FOLLOWERS FOR CIRCUIT BREAKERS AND RELATED METHODS

(71) Applicant: Eaton Corporation, Cleveland, OH (US)

(72) Inventor: William G. Eberts, Moon Township, PA (US)

(73) Assignee: Eaton Corporation, Cleveland, OH (US)

( * ) Notice: Subject to any disclaimer, the term of this patent is extended or adjusted under 35 U.S.C. 154(b) by 202 days.

(21) Appl. No.: 13/923,754

(22) Filed: Jun. 21, 2013

(65) Prior Publication Data
US 2014/0374227 A1 Dec. 25, 2014

(51) Int. Cl.
*H01H 33/02* (2006.01)
*H01H 3/54* (2006.01)
*F16H 25/08* (2006.01)
*H01H 71/02* (2006.01)
*H01H 1/58* (2006.01)
*H01H 71/74* (2006.01)

(52) U.S. Cl.
CPC .............. *H01H 3/54* (2013.01); *F16H 25/08* (2013.01); *H01H 71/0207* (2013.01); *H01H 1/5822* (2013.01); *H01H 2071/749* (2013.01); *Y10T 74/2107* (2015.01)

(58) Field of Classification Search
CPC ............................ H01H 3/54; H01H 71/0207

USPC .......................................................... 200/237
See application file for complete search history.

(56) References Cited

U.S. PATENT DOCUMENTS

| | | | |
|---|---|---|---|
| 4,864,261 A * | 9/1989 | Kandatsu ....................... 335/16 |
| 5,131,504 A | 7/1992 | Yoo et al. |
| 5,515,018 A * | 5/1996 | DiMarco et al. ................ 335/16 |
| 5,565,827 A | 10/1996 | Gula et al. |
| 5,874,699 A | 2/1999 | Beck et al. |
| 5,960,941 A * | 10/1999 | Castonguay et al. ......... 200/308 |
| 5,981,887 A * | 11/1999 | Robarge et al. ............... 200/308 |
| 6,249,197 B1 * | 6/2001 | Zindler et al. ................ 335/202 |
| 6,489,867 B1 | 12/2002 | Turner et al. |
| 6,801,110 B2 | 10/2004 | Kolberg et al. |
| 8,222,983 B2 | 7/2012 | Zhou et al. |
| 2003/0222739 A1 | 12/2003 | Kolberg et al. |
| 2014/0374227 A1 * | 12/2014 | Eberts ........................... 200/237 |

OTHER PUBLICATIONS

International Search Report and Written Opinion for corresponding PCT Application No. PCT/US2014/038558, date of mailing Sep. 1, 2014.

* cited by examiner

*Primary Examiner* — Kyung Lee
(74) *Attorney, Agent, or Firm* — Myers Bigel Sibley & Sajovec, P.A.

(57) ABSTRACT

Circuit breakers with a cam follower having an upper post with the cam follower held by a cross bar to prevent cam/arm misalignment during high interruption shot on the breaker. Related cam followers have an upwardly extending post located on one side edge portion and cooperates with a shunt to provide shunt separation during high interruption breaker shots.

18 Claims, 8 Drawing Sheets

SHUNT SEPARATING CAM FOLLOWERS FOR CIRCUIT BREAKERS AND RELATED METHODS

FIELD OF THE INVENTION

The present invention relates to circuit breakers.

BACKGROUND OF THE INVENTION

Circuit breakers are one of a variety of overcurrent protection devices used for circuit protection and isolation. The circuit breaker provides electrical protection whenever an electric abnormality occurs. In a circuit breaker, current enters the system from a power line and passes through a line conductor to a stationary contact fixed on the line conductor, then to a movable contact. The movable contact can be fixedly attached to a pivoting arm. As long as the stationary and movable contacts are in physical contact, current passes from the stationary contact to the movable contact and out of the circuit breaker to down line electrical devices.

In the event of an overcurrent condition (e.g., a short circuit), extremely high electromagnetic forces can be generated. The electromagnetic forces repel the movable contact away from the stationary contact. As shown by an example of a prior art circuit breaker in FIGS. 1A and 1B, the circuit breaker 10 includes a stationary contact 30, a moveable arm 35, a cam follower 50, a crossbar 60 and a shunt 40. Because the movable contact 35c is fixedly attached to the rotating arm 35, the arm 35 pivots and physically separates the stationary 30 and movable contacts 35c, and the current is stopped as the breaker mechanism moves to the tripped position.

Upon separation of the contacts and blowing open the circuit, an arcing condition occurs. The breaker's trip unit will trip the breaker which will cause the contacts to separate. Also, arcing can occur during normal "ON/OFF" operations on the breaker.

Figure 1A:
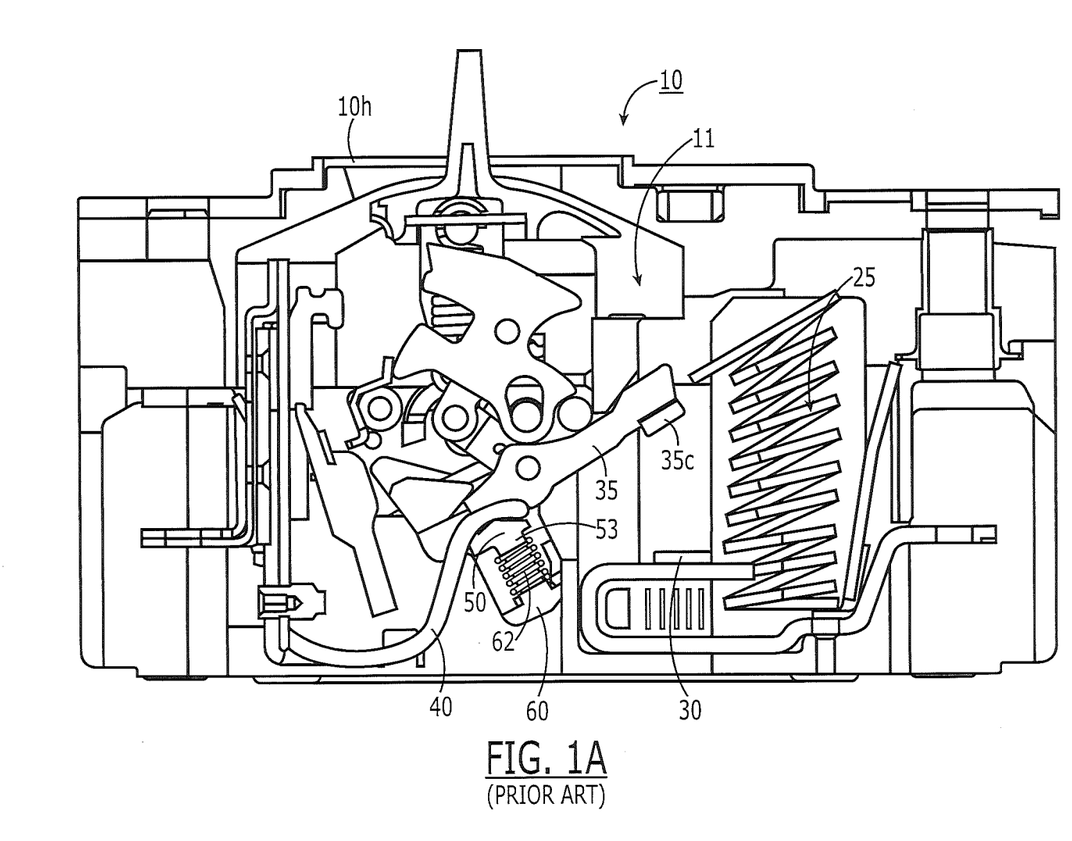
FIGS. 1A and 1B are a side partial cutaway views of an exemplary prior art circuit breaker.

During a high interruption shot on the breaker (e.g., an EG breaker, where "E" reflects breaker size, and "G" represents the breaker is part of the "G" or global series), the shunts are pulled together by the electrically generated magnetic fields. The contact arm also rotates during the high interruption shot. As shown by the desired normal off configuration of the crossbar 60 and arm 35 in FIG. 1A compared to the configuration in FIG. 1B, sometimes the shunt 40 undesirably travels to a position on top of the contact arm 35 which prevents the arm from fully resetting after the interruption terminates and the mechanism rotates the crossbar 60 to the tripped position. This then prevents the breaker from making contact when the breaker is closed.

SUMMARY OF EMBODIMENTS OF THE INVENTION

Embodiments of the present invention are directed to circuit breakers with a rotating arm having a cam follower with an upper post.

Embodiments of the invention provide circuit breakers with a cam follower having an upper post with the cam follower held by a cross bar to prevent cam/arm misalignment during high interruption shot on the breaker.

Embodiments of the invention provide cam followers that have an upwardly extending post located on one side edge portion and that cooperates with a shunt to provide shunt separation during high interruption breaker shots.

Embodiments of the invention are directed to circuit breakers. The circuit breakers include a housing having a movable arm, cross bar and cam follower in the housing. The cam follower includes an upper post.

The upper post can reside on an outer edge portion of one side of the cam follower.

The cam follower can have a substantially rectangular primary body with two opposing long sides connected by two opposing short sides. The upper post can reside on a medial portion of one of the long sides.

The upper post can have an upwardly extending outer surface that is parallel to an upwardly extending outer surface of adjacent portions of the long side of the primary body.

The cam follower can have a lower post that has an axially extending centerline that is offset from a longitudinally extending centerline of the upper post.

The cam follower can include a lower post. The cam follower with the upper and lower posts can be a unitary monolithic member.

The cam follower can have a primary body that comprises a material. The upper post may be the same or different material as the primary body.

The circuit breaker can include at least one shunt in the housing that has a length that extends from a location outside the cross bar to travel past the upper post over an upper surface of the cam follower whereby the post keeps shunts separated during high interruption breaker shots.

The cam follower can have a substantially rectangular shape with opposing long sides connected by a opposing short sides, and an upper surface having a flat medial segment that extends in a width direction corresponding to the long sides. The upper post can reside laterally centered with respect to the width direction. The upper surface can have a front end portion that tapers down from the medial segment, and the short sides of the cam follower can each comprises a recess.

The arm can have a width and the cam follower can have a corresponding width.

The upper post can be substantially rectangular and can have an upper surface with an outer edge portion that tapers down at an angle that is between about 15-30 degrees.

Other embodiments are directed to cam followers for a circuit breaker. The cam followers include a primary body and an upwardly extending post that resides on an outer edge portion of one side of the primary body.

The primary body can have two opposing long sides connected by two opposing short sides. The upwardly extending post can reside on a medial portion of one of the long sides.

The upper post can have an upwardly extending wall with an outer surface that is parallel to an upwardly extending outer surface of adjacent side wall portions of the long side of the primary body.

The cam follower can include a lower post that extends down from the primary body. The lower post can have an axially extending centerline that is offset from a longitudinally extending centerline of the upper post.

The primary body and the upper and lower posts can be configured as a unitary monolithic member of steel powdered metal or zinc die cast material.

The material may comprise a zinc alloy.

The primary body can have a substantially rectangular shape with opposing long sides connected by opposing short sides, and an upper surface having a flat medial segment that extends in a width direction corresponding to a direction of the long sides, with the upper post residing laterally centered with respect to the long sides. The upper surface can have a front end portion that tapers down from the medial segment.

The upper post can be substantially rectangular and can have an upper surface with an outer edge portion that tapers down at an angle that is between about 15-30 degrees.

Still other embodiments are directed to circuit breakers that include: a housing, a movable contact arm in the housing, a cross bar in the housing in cooperating alignment with the arm, and a cam follower held by the cross bar in communication with the arm. The cam follower has an upper surface. The circuit breakers also include first and second shunts in the housing that have a length that extends from a location outside the cross bar to travel over the upper surface of the cam follower. The cam follower includes an upper surface that is configured to maintain shunt separation and prevent shunt travel onto a top of the contact arm during a high interruption shot.

Still other embodiments are directed to methods of fabricating cam followers for circuit breakers. The methods include fabricating a cam follower with an upwardly extending post on one side thereof. Optionally, the fabricating can be carried out by die casting a material to form a monolithic component with the upwardly extending post. Also optionally, the fabricating can be carried out to form a cam follower primary body with a substantially rectangular shape with a pair of spaced apart long sides connected by a pair of spaced apart short sides, with the upwardly extending post being substantially centered along one of the one sides.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

DETAILED DESCRIPTION OF EMBODIMENTS OF THE INVENTION

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 40, 40', 40", 40'").

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 1B:
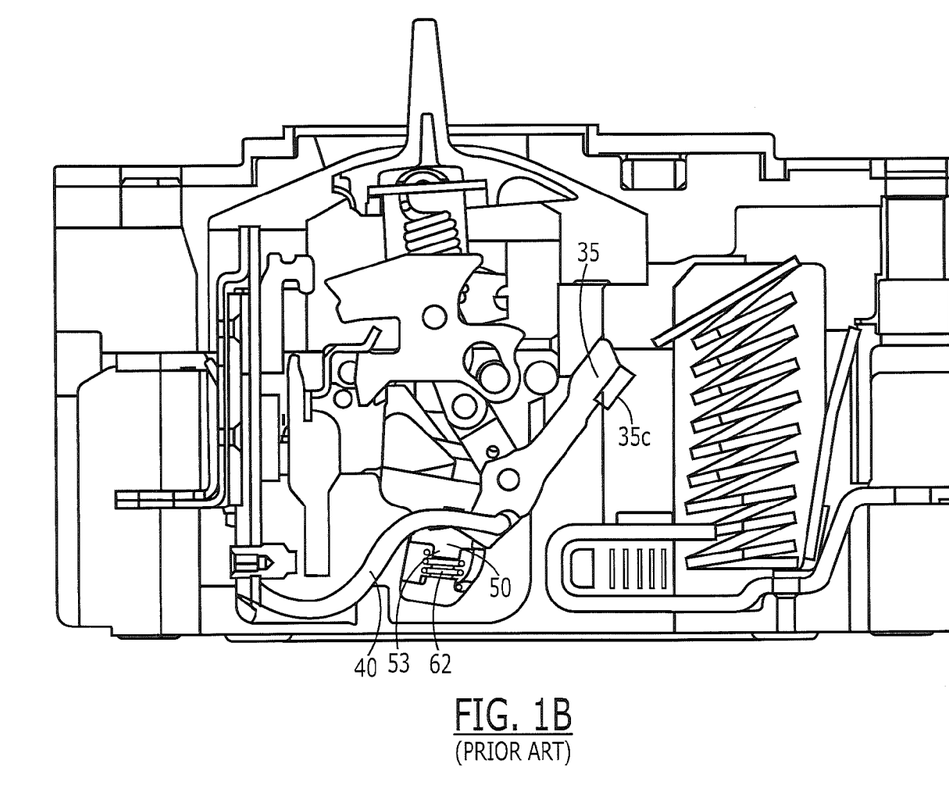

Turning now to the figures, FIGS. 1A and 1B illustrate a circuit breaker 10 with a housing 10h. As is well known, in the housing 10h, the circuit breaker 10 includes at least one arc chamber 11 having an arc chute 25 with arc plates, a rotating arm 35 with a contact 35c (e.g., a "contact arm") and a line conductor assembly comprising a stationary contact 30. The arc plates can be stacked and are typically configured as closely spaced plates as shown. As is also known by those of skill in the art, the circuit breaker 10 can also include a shunt 40, a cam C (FIGS. 2, 3A, 3B), a cam follower 50 and a crossbar 60. The cam follower 50 typically resides in a channel of the crossbar over a spring 62 or other biasing member, allowing the cam follower 50 to travel up and down a distance. FIG. 1B illustrates that the conventional cam follower 50 was configured such that the arm 35 could undesirably move out of proper cooperating position with the cam C after a high shot interruption.

Figure 2:
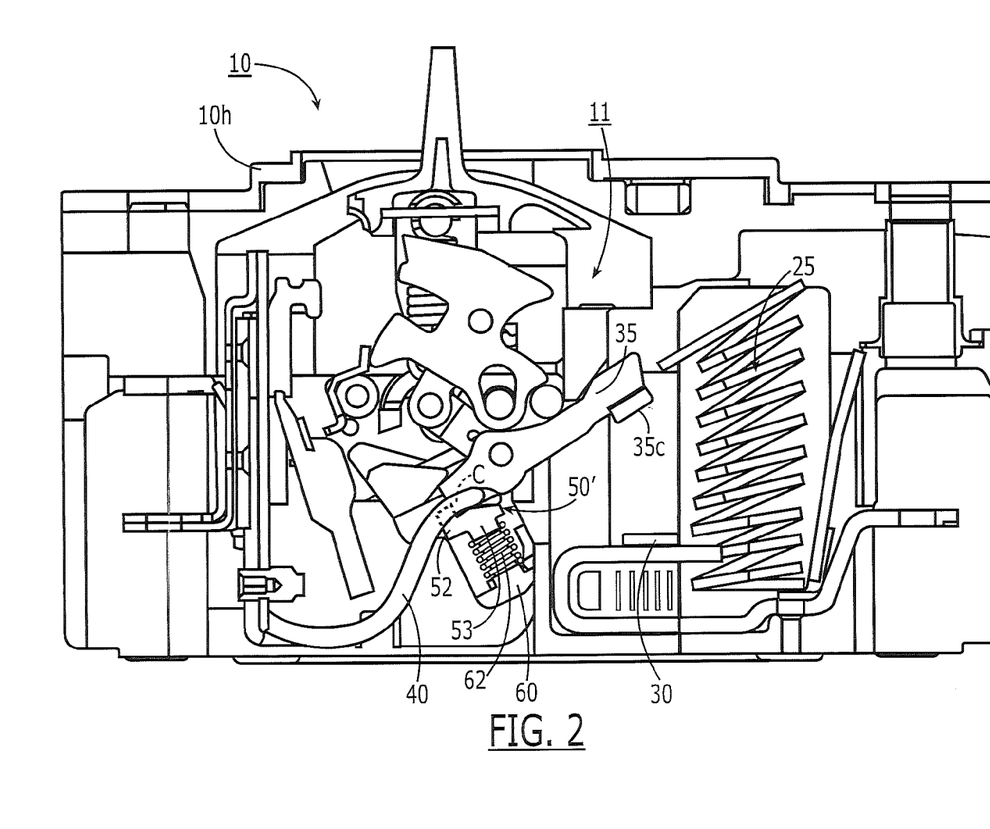
FIG. 2 is a side partial cutaway view of a circuit breaker according to embodiments of the present invention.
Figure 3A:
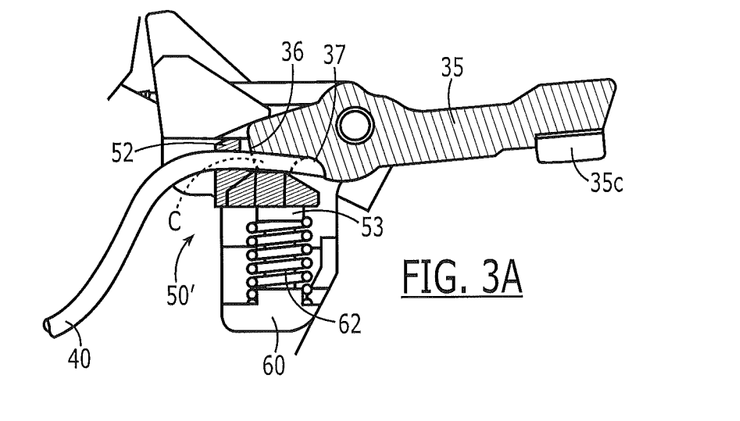
FIG. 3A is an enlarged side view of the arm, cam follower and shunt shown in FIG. 2 according to embodiments of the present invention.
Figure 3B:
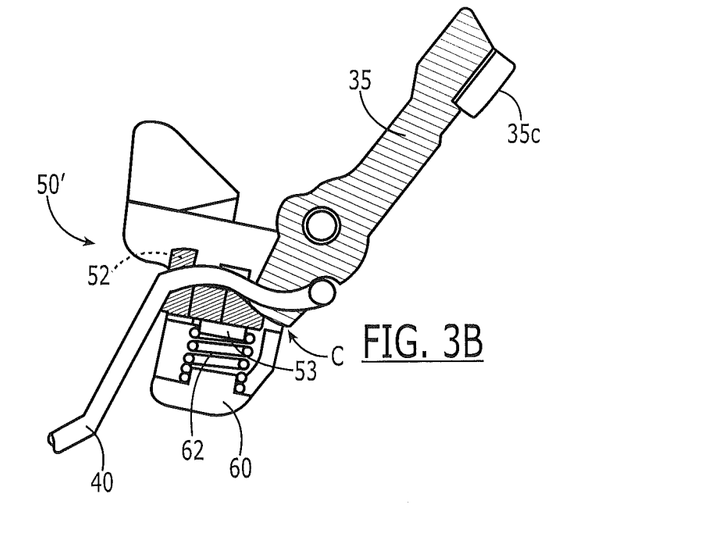
FIG. 3B is an enlarged side view of the arm, cam follower and shunt shown in FIG. 3A, illustrating the arm in an "OFF" configuration according to embodiments of the present invention.
Figure 3C:
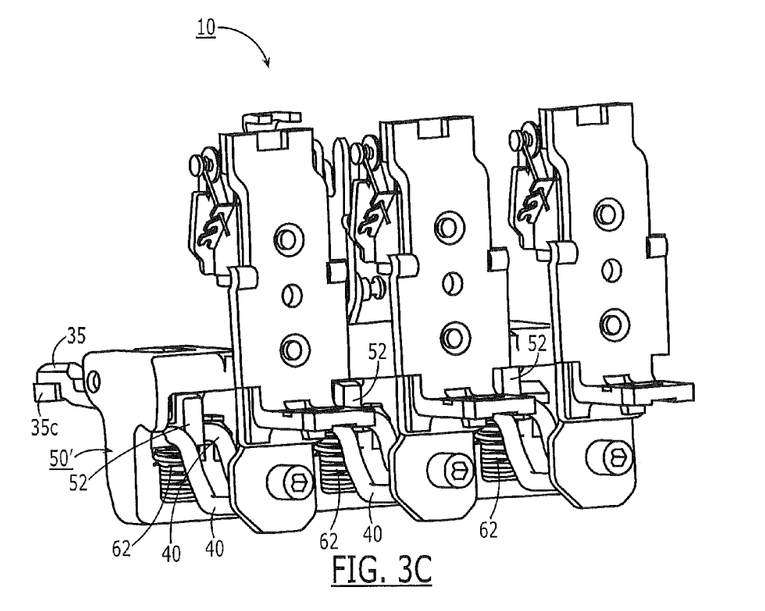
FIG. 3C is a side perspective view of a portion of a circuit breaker showing side-by-side cam followers and respective posts according to embodiments of the present invention.
Figure 3D:
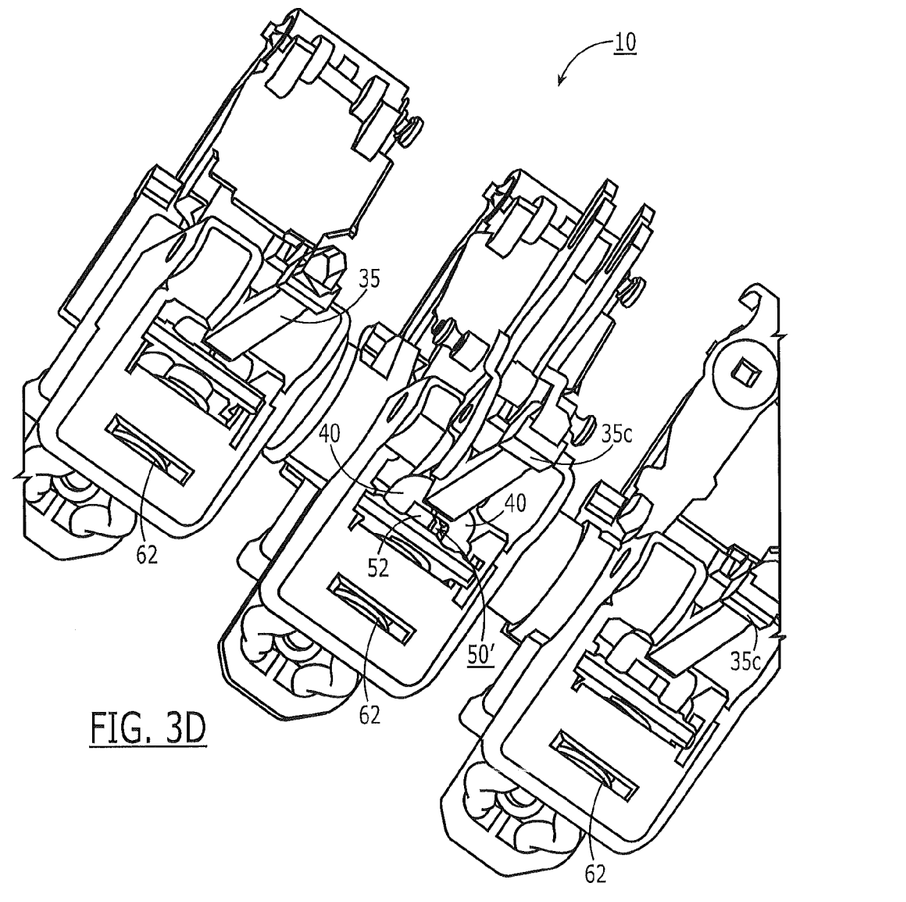
FIG. 3D is a perspective view of the portion of the circuit breaker shown in FIG. 3C.

As shown in FIGS. 2, 3A-3D, in some embodiments a new cam follower 50' can include an upper surface configured to engage at least one shunt and provide positive shunt separation. The cam follower 50' can include an upwardly extending member that projects a distance above a primary body 50b such as an upper post 52. The upper member can provide lateral spacing between shunts (FIGS. 3C, 3D). The upper post 52 can reside along one side portion of the cam follower 50' on the side that resides away from the arm 35. In some embodiments, such as where the primary body of the cam 50b has a substantially rectangular shape (FIG. 4A), the post 52 can be substantially centered on one long side of the follower body 50b.

Although shown as a single upper post 52, more than one upper post 52 may be used. If more than one upper post 52 is used, they can be spaced apart or abutting and may reside along one side or two or three sides of the cam follower primary body as long as they do not interfere with the cam/cam follower operation.

The upper post 52 can be sized and configured to keep the shunt(s) 40 separated during high interruption breaker shots. Stated differently, the post 52 can maintain the proper position of the arm 35 with the cam C and prevent the arm from improperly moving out of cooperating alignment with the cam C after a high shot interruption to allow the breaker to have a normal "OFF" configuration to fully reset to make contact with the breaker is closed as shown in FIG. 2.

FIGS. 4A-4E illustrate an example of the cam follower 50' with the upper post 52. The upper post 52 can be integral with the primary body of cam follower 50b such that the cam follower with the upper post 52 (and, where used, a lower post 53) is a unitary monolithic component.

In other embodiments, the upper post 52 can be a separate component that is mechanically and/or adhesively attached to the cam follower primary body 50b, e.g., one or more of brazed, welded, adhesively attached, screwed, pinned or matably attached such as via a tongue and groove configuration, snap-fit features, bayonet features, frictional engagement and the like.

Although the cam follower 50' is shown in the figures as including a single lower post 53, in other embodiments, the cam follower 50' may include a different lower body configuration that does not require the lower post 53 or the lower post 53 may have a different configuration (and may be provided as more than one lower post) or placed at a different position but, where used, is typically configured to cooperate with the spring 62 or other biasing member in the cross bar 60.

The cam follower primary body 50b and post 52 can comprise the same or different material or formulations (e.g., alloys). The primary body of the cam follower 50b can have the same material as the post 52. In other embodiments, the upper post 52 can comprise a different material.

The upper post 52 and the primary body of the cam follower 50b can both be formed of a die cast zinc alloy or powered metal. The upper post 52 and cam follower 50b can, in some embodiments, comprise steel powdered metal and/or zinc die cast. The upper post 52 can be integral with the cam body 50b and the cam follower can be powdered metal.

Still referring to FIGS. 4A-4E, for example, the primary body of the cam follower 50b can have a width W and a length L. The width W of the primary body of the cam follower 50b can be about the same or substantially the same as the width of the arm 35.

Referring again to FIGS. 3A and 3B, the arm 35 can include a back end 36 and a recess 37 on a lower surface proximate the back end 36. When the arm 35 is down, as shown in FIG. 3A, the top of the upper post 52 resides proximate but under the cross bar. When raised in a normal OFF position as shown in FIG. 3B, the shunt passes through the arm recess 37. A portion of the arm 35 can define the cam C (FIGS. 2, 3A, 3B). The back end 36 can rotate to face downward to contact the upper surface of the forward end 50f of the cam follower 50', which presses the cam follower 50' down, compressing the spring 62 and tilting the cross bar slightly forward, typically at an angle from vertical that is between about 10-30 degrees.

Figures 4A, 4B, 4C, 4D:
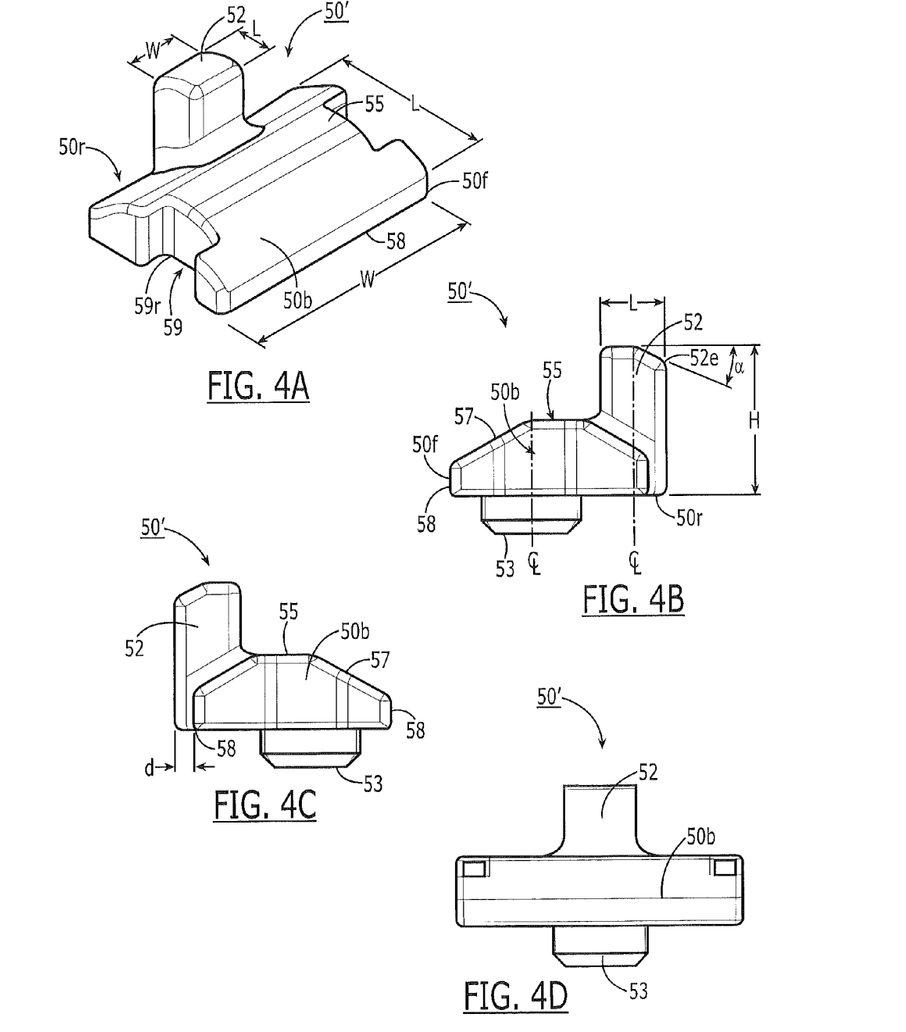
FIG. 4A is a greatly enlarged side perspective view of an exemplary cam follower for a circuit breaker according to embodiments of the present invention.
FIG. 4B is a side view of the cam follower shown in FIG. 4A.
FIG. 4C is a scaled side view of the cam follower shown in FIG. 4A according to embodiments of the present invention.
FIG. 4D is an end view of the cam follower shown in FIG. 4C.

As shown in FIG. 4B, the axially extending centerline C/L of the lower post 53 can be laterally offset from the longitudinally extending centerline C/L of the upper post 52.

Figure 4E:
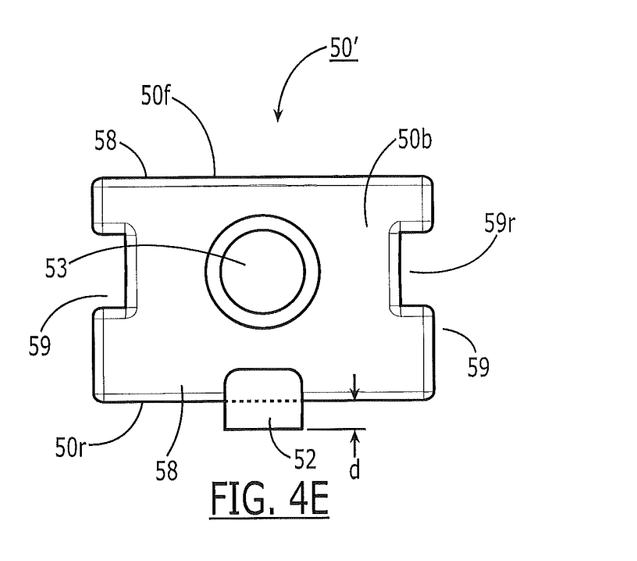
FIG. 4E is a bottom view of the cam follower shown in FIG. 4C.

As shown in FIGS. 4B, 4C and 4E the lower post 53 (where used) can reside closer to a front edge 50f of the cam follower. The upper post 52 can reside adjacent a rear edge 50r of the cam follower 50'.

The primary body of the cam follower 50b can have a substantially rectangular shape with a middle peak region 55 and a perimeter with two opposing long sides 58 connected by two opposing short sides 59. The short sides 59 can include center recesses 59r. The recesses 59r can cooperate with molded or other formed features of adjacent components for alignment/positioning in the housing. The peak region 55 can taper down to the long sides 58. In position, the arm 35 and upper post 52 can both be laterally centered with respect to each other and such that their width dimensions are centered.

The height of the upper post 52 can be any suitable height without hitting the crossbar 60 when the arm 35 is in a normal "OFF" position. In some embodiments, the upper post 52 can have a height that is between about 2× to 10× times that of the lower post 53, typically between 2× to about 4× that of the lower post 53. The upper post 52 may have a width W that is less than a width (e.g. diameter) of the lower post 53. In other embodiments, the upper post 52 and lower post 53 may have about the same width and/or height. In some particular embodiments, the post 52 can have a width W that is between about 0.1-0.2 inches.

The upper post 52 can be substantially rectangular. However, the upper post 52 can have other geometric configurations.

As shown in FIG. 4B, for example, the post 52 can have an outer upper edge portion 52e that tapers down at an angle α that can be between about 10-45 degrees, such as between about 10-30 degrees, typically about 23 degrees.

As shown in FIGS. 4B, 4C and 4E, the upper post 52 can be configured to extend a short distance "d" outside the perimeter or bounds of the long side 58 of the primary body 50b. However, in other embodiments, the post 52 can be flush with or even recessed inside the long side boundary.

In some embodiments, the circuit breakers 10 can be DC circuit breakers, AC circuit breakers, or both AC and DC circuit breakers, if the circuit breakers employ cam followers and shunts.

In some embodiments, the circuit breakers 10 can be EG circuit breakers.

The circuit breakers 10 can be rated for voltages between about 1 V to about 5000 volts (V) DC and/or may have current ratings from about 15 to about 2,500 Amperes (A). However, it is contemplated that the circuit breakers 10 and components thereof can be used for any voltage, current ranges and are not limited to any particular application as the circuit breakers can be used for a broad range of different uses.

The circuit breakers 10 can be a bi-directional direct current (DC) molded case circuit breaker (MCCB). See, e.g., U.S. Pat. Nos. 5,131,504 and 8,222,983, the contents of which are hereby incorporated by reference as if recited in full herein. The DC MCCBs can be suitable for many uses such as data center, photovoltaic, and electric vehicles applications.

As is known to those of skill in the art, Eaton Corp. has introduced a line of molded case circuit breakers (MCCBs) designed for commercial and utility scale photovoltaic (PV) systems. Used in solar combiner and inverter applications, Eaton PVGard™ circuit breakers are rated up to 600 amp at 1000 Vdc and can meet or exceed industry standards such as UL 489B, which requires rigorous testing to verify circuit protection that meets the specific requirements of PV systems. However, it is contemplated that the circuit breakers 10 can be used for various applications with corresponding voltage capacity/rating.

Figure 5:
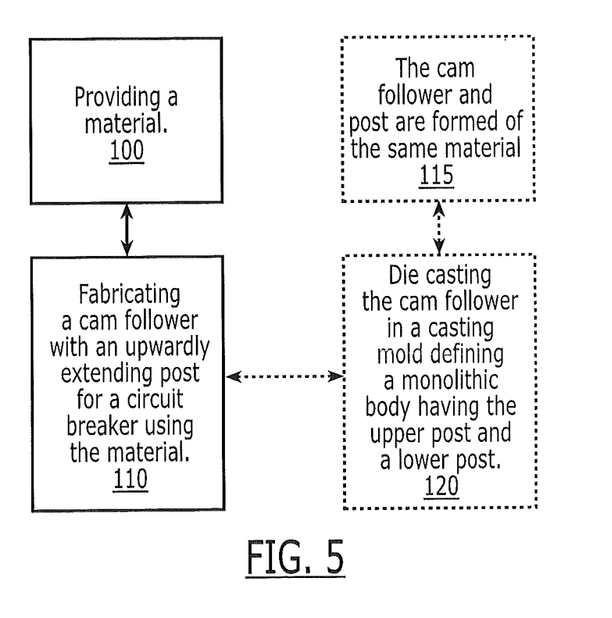
FIG. 5 is a flow chart of exemplary operations that can be used to control shunt position in a circuit breaker during a high shot action according to embodiments of the present invention.

FIG. 5 illustrates operations that can be used to fabricate a cam follower for a circuit breaker. As shown, material can be provided (block 100). A cam follower with an upwardly extending post for a circuit breaker is fabricated using the material (block 110).

The cam follower and upper post can be formed of the same material (block 115).

The fabrication can be carried out by die casting the cam follower in a casting mold defining a monolithic body having the upper post and a lower post (block 120).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed:

1. A circuit breaker, comprising:
   a housing;
   a movable arm in the housing;
   a cross bar in the housing in cooperating alignment with the arm;
   a cam follower held by the cross bar so that the cam follower is in communication with the arm, wherein the cam follower comprises an upper post; and
   at least one shunt in the housing that has a length that extends from a location outside the cross bar to travel past the upper post over an upper surface of the cam follower whereby the post keeps shunts separated during high interruption breaker shots.

2. The circuit breaker of claim 1, wherein the upper post resides on an outer edge portion of one side of the cam follower with a width that is less than a width of the cam follower to allow adjacent shunts to extend over the cam follower upper surface with the upper post therebetween to keep adjacent shunts separated.

3. The circuit breaker of claim 1, wherein the cam follower has a substantially rectangular primary body with two opposing long sides connected by two opposing short sides, and wherein the upper post resides on a medial portion of one of the long sides.

4. The circuit breaker of claim 3, wherein the upper post has an upwardly extending outer surface that is parallel to an upwardly extending outer surface of adjacent portions of the long side of the primary body.

5. The circuit breaker of claim 1, wherein the cam follower has a lower post that has an axially extending centerline that is offset from a longitudinally extending centerline of the upper post.

6. The circuit breaker of claim 1, wherein the cam follower further comprises a lower post, and wherein the cam follower with the upper and lower posts is a unitary monolithic member.

7. The circuit breaker of claim 1, wherein the cam follower has a primary body and the primary body and upper post are integrally formed and are steel powdered metal or zinc die cast.

8. The circuit breaker of claim 1, wherein the arm has a width and the cam follower has a corresponding width.

9. The circuit breaker of claim 1, wherein the upper post is substantially rectangular and has an upper surface with an outer edge portion that tapers down at an angle that is between about 15-30 degrees.

10. A circuit breaker, comprising:
    a housing;
    a movable arm in the housing;
    a cross bar in the housing in cooperating alignment with the arm; and
    a cam follower held by the cross bar in communication with the arm, wherein the cam follower comprises an upper post;
    wherein the cam follower has a substantially rectangular shape with opposing long sides connected by opposing short sides, and an upper surface having a flat medial segment that extends in a width direction corresponding to the long sides, with the upper post residing laterally centered with respect to the width direction, wherein the upper surface has a front end portion that tapers down from the medial segment, and wherein the short sides of the cam follower each comprises a recess.

11. A cam follower for a circuit breaker, comprising:
a primary body; and
an upwardly extending post that resides on an outer edge portion of one side of the primary body, wherein the upwardly extending post has a width that is less than a width of the cam follower primary body, wherein the primary body has two opposing long sides connected by two opposing short sides, and wherein the upwardly extending post resides on a medial portion of one of the long sides.

12. The cam follower of claim 11, wherein the upwardly extending post has an upwardly extending wall with an outer surface that is parallel to an upwardly extending outer surface of adjacent side wall portions of the long side of the primary body.

13. The cam follower of claim 11, wherein the upwardly extending post is an upper post, the cam follower further comprising a lower post that extends down from the primary body, wherein the lower post has an axially extending centerline that is offset from a longitudinally extending centerline of the upper post.

14. The cam follower of claim 13, wherein the primary body and the upper and lower posts are configured as a unitary monolithic member of steel powdered metal or zinc die cast material.

15. The cam follower of claim 13, wherein the primary body and the upper and lower posts are configured as a unitary monolithic member comprising zinc alloy.

16. The cam follower of claim 11, wherein the upwardly extending post is substantially rectangular and has an upper surface with an outer edge portion that tapers down at an angle that is between about 15-30 degrees.

17. A cam follower for a circuit breaker, comprising:
a primary body; and
an upwardly extending post that resides on an outer edge portion of one side of the primary body,
wherein the primary body has a substantially rectangular shape with opposing long sides connected by opposing short sides, and an upper surface having a flat medial segment that extends in a width direction corresponding to a direction of the long sides, with the upper post residing laterally centered with respect to the long sides, and wherein the upper surface has a front end portion that tapers down from the medial segment.

18. A circuit breaker, comprising:
a housing;
a movable contact arm in the housing;
a cross bar in the housing in cooperating alignment with the contact arm;
a cam follower held by the cross bar so that the cam follower is in communication with the contact arm, the cam follower having an upper surface; and
first and second shunts in the housing that have a length that extends from a location outside the cross bar to travel over the upper surface of the cam follower,
wherein the cam follower upper surface has an upwardly extending post with a width that is less than a width of a primary body of the cam follower and is adapted to allow a respective shunt to extend over the cam follower upper surface past one side of the upwardly extending post to maintain shunt separation to thereby prevent shunt travel onto a top of the contact arm during a high interruption shot.

* * * * *